United States Patent [19]

Flynn

[11] 4,294,072
[45] Oct. 13, 1981

[54] MASTER CYLINDER AND RESERVOIR ASSEMBLIES

[75] Inventor: Derek J. Flynn, Solihull, England

[73] Assignee: Lucas Industries Limited, Birmingham, England

[21] Appl. No.: 80,065

[22] Filed: Sep. 28, 1979

[30] Foreign Application Priority Data

Oct. 4, 1978 [GB] United Kingdom ............... 39336/78

[51] Int. Cl.³ .............................................. B60T 11/26
[52] U.S. Cl. ........................................ 60/585; 60/592
[58] Field of Search ................. 60/585, 592, 588, 589

[56] References Cited

U.S. PATENT DOCUMENTS

| 2,148,232 | 2/1939 | Bowen | 60/588 |
|---|---|---|---|
| 2,564,137 | 8/1951 | Wahlberg | 60/588 |
| 2,638,748 | 5/1953 | Miller | 60/589 |
| 3,427,807 | 2/1969 | Moyes | 60/589 |
| 3,479,068 | 11/1969 | Brittain | 60/585 |
| 4,132,073 | 1/1979 | Ewald | 60/592 |
| 4,147,270 | 4/1979 | Brandon, Jr. | 60/592 |
| 4,168,613 | 9/1979 | Nakagawa | 60/592 |

FOREIGN PATENT DOCUMENTS

| 1246439 | 8/1967 | Fed. Rep. of Germany | 60/585 |
|---|---|---|---|
| 2335530 | 1/1974 | Fed. Rep. of Germany | 60/585 |
| 2458632 | 7/1975 | Fed. Rep. of Germany | 60/585 |
| 1004639 | 9/1965 | United Kingdom | 60/588 |
| 1024596 | 3/1966 | United Kingdom | 60/585 |
| 1403376 | 8/1975 | United Kingdom | 60/585 |

Primary Examiner—Abraham Hershkovitz
Attorney, Agent, or Firm—Scrivener, Clarke, Scrivener and Johnson

[57] ABSTRACT

A master cylinder and reservoir assembly comprises a reservoir (2) having a depending foot portion (13). For ease of assembly of the reservoir on the master cylinder (1), the foot portion (13) has opposed laterally extending projections which slide in complementary longitudinal recesses (12) at the top of the master cylinder. The reservoir may be held in place by friction, or some arrangement for positively retaining the reservoir may be provided.

4 Claims, 8 Drawing Figures

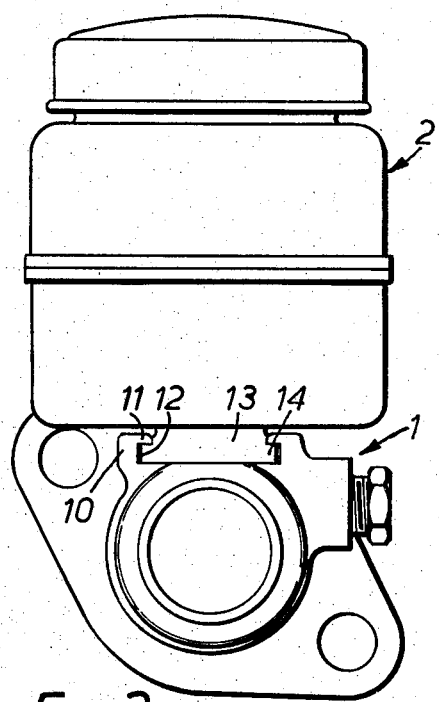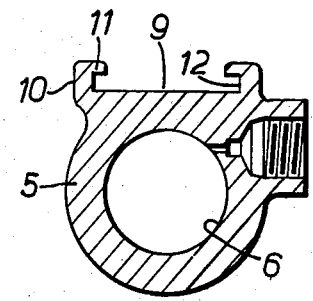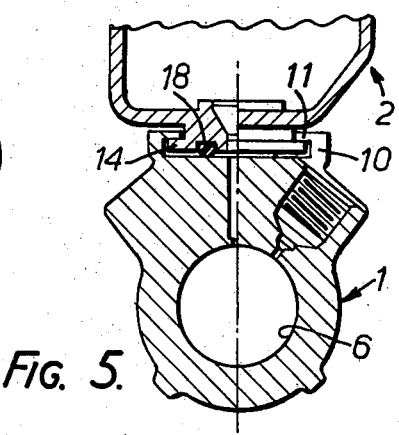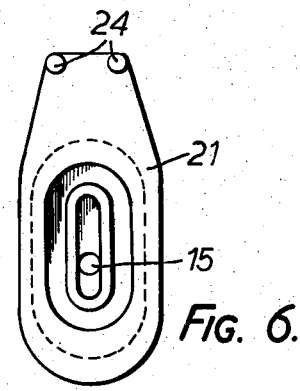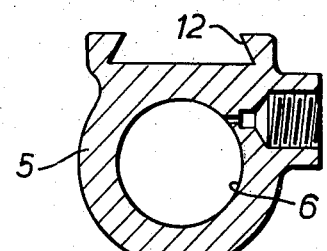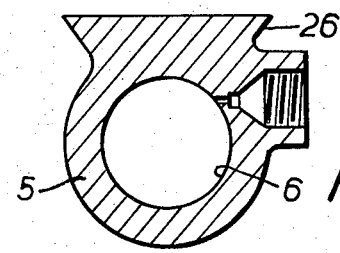

MASTER CYLINDER AND RESERVOIR ASSEMBLIES

This invention relates to master cylinder and reservoir assemblies for vehicle braking systems.

In known assemblies, the top of the master cylinder body has one or more upstanding bosses each having two apertures therein constituting the inlet and recuperation openings of the master cylinder. The number of bosses is dependent upon the number of pressure chambers in the master cylinder so that a tandem master cylinder has two bosses. The reservoir is mounted upon and connected to the bosses with an outlet opening communicating with each set of inlet and recuperation openings.

The known assemblies have the disadvantage that the master cylinder body is produced by casting which, when it is made from aluminium, has a high scrap rate, that the overall height of the assembly is large and that assembly of the reservoir on the master cylinder body is time-consuming.

The present invention aims to overcome one or more of the above disadvantages and provides a master cylinder and reservoir assembly in which the master cylinder and reservoir have co-operating projections and recesses so arranged as to permit interconnection of the reservoir and master cylinder by relative sliding movement.

Preferably, the master cylinder has longitudinally extending recesses which receive complementary projections on the reservoir.

Locating means are preferably provided for positively locating the reservoir in a desired predetermined position on the master cylinder and for retaining the reservoir in that position.

Some forms of master cylinder and reservoir assembly in accordance with the invention will now be described by way of example, with reference to the accompanying drawings, in which:

FIG. 2 is an end view of the assembly of FIG. 1;

FIG. 3 is a detail transverse cross-section of the master cylinder of FIG. 1;

FIG. 5 is a detail transverse cross-sectional view of the assembly of FIG. 4 in one half through an outlet of the reservoir and in the other half through an outlet of the master cylinder;

FIG. 6 is a detail plan view from beneath a foot portion of the reservoir of FIG. 4, and FIGS. 7 and 8 are views similar to FIG. 3 showing different forms of master cylinder.

Figure 1:
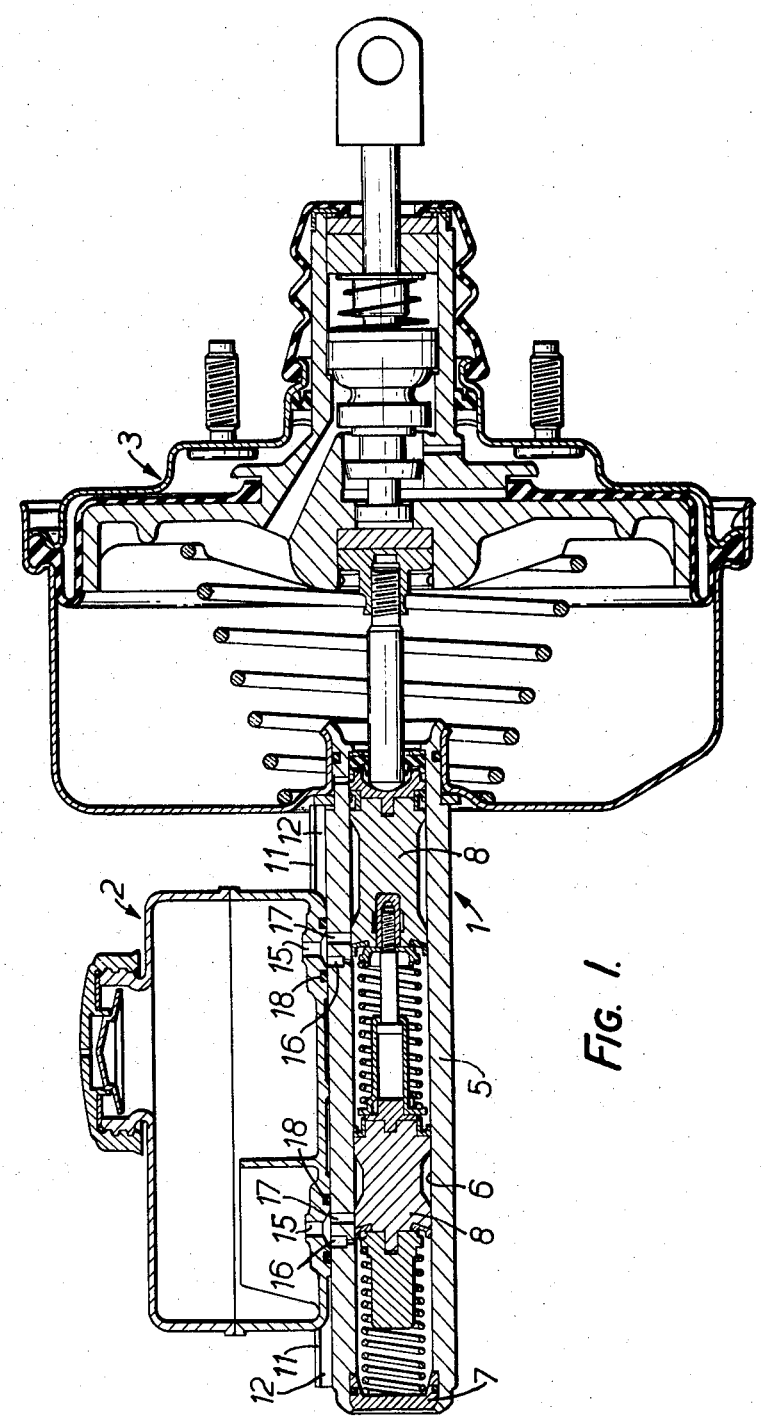
FIG. 1 is an axial cross-sectional view of one form of the assembly attached to a servo booster.

Each form of assembly comprises a tandem master cylinder 1 to which is attached a fluid reservoir 2. In FIG. 1 the master cylinder 1 is shown attached to the servo booster 3 by means of a swaged connection 4. The servo booster 3 forms no part of the present invention and requires no further description here.

The master cylinder body 5 is extruded from aluminium or other suitable material and has a bore 6 which is closed at one end by a swaged plug 7. Two pistons 8 work in the bore in the usual way.

As best seen in FIG. 3, the upper surface 9 of the master cylinder body 5 is flat and has two upstanding projection 10 with inwardly directed flanges 11 which define respective longitudinal recesses 12.

The reservoir 2 is moulded from plastics material and has a downwardly depending foot portion 13 with opposed outwardly directed longitudinal projections 14 which are complementary to the recesses 12 of the master cylinder. The foot portion 13 has two output ports 15, one for each chamber of the master cylinder, which are arranged to co-operate with inlet and recuperation openings 16 and 17, respectively, in the master cylinder. Surrounding each outlet port 15 is a groove receiving a face seal 18.

To attach the reservoir to the master cylinder, it is necessary simply to slide the reservoir 2 on to the master cylinder body 5 with the projections 14 engaging respectively in the recesses 12. A stop (not shown) may be provided to ensure that the reservoir is properly located, as illustrated in FIG. 1, with the outlet ports 15 co-operating with the openings 16 and 17 in the master cylinder. The reservoir may be positively retained relative to the master cylinder by the frictional contact between the reservoir and the cylinder body, although other retaining means may be provided, for example as will be described with reference to the form of assembly of FIGS. 4 to 6.

In the above-described assembly the base of the reservoir rests directly on the top surface 9 of the master cylinder body and the height of the assembly is thereby reduced as compared to known assemblies in which the reservoir is mounted upon and connected to upstanding bosses formed on the top of the master cylinder body. A typical known form of assembly is indicated in chain link lines in FIGS. 1 and 2.

Figure 4:
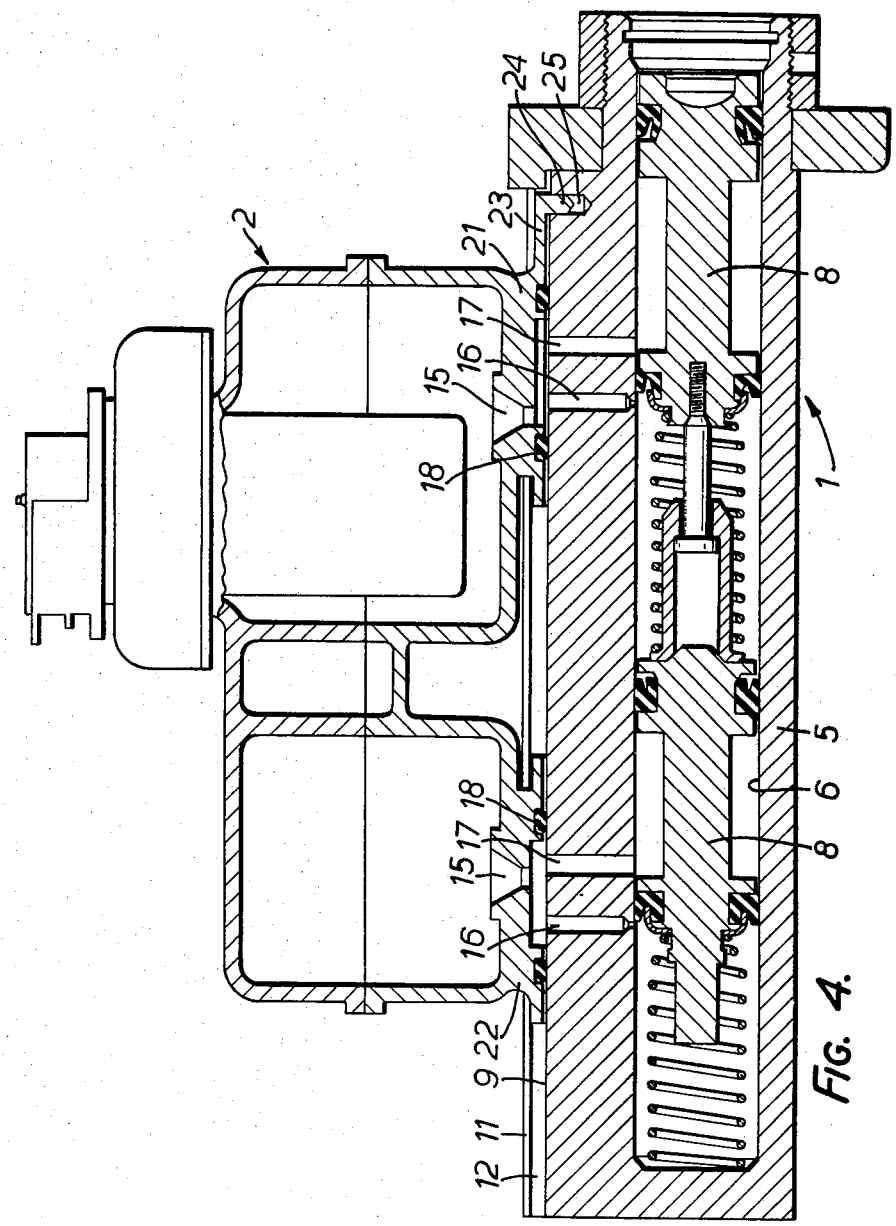
FIG. 4 is an axial cross-sectional view of another form of assembly.

The assembly of FIGS. 4 to 6 is generally similar to that described above and parts which correspond to those of the previously described assembly are given the same reference numerals.

In the assembly of FIGS. 4 to 6, the master cylinder body has an integral end 20, the bore 6 being drilled from an extruded bar. The reservoir 2 has two foot portions 21, 22 each of which has laterally outwardly extending projections 14. The forward end of the front foot portion 21 has a forwardly extending part 23 having two laterally spaced apart, downwardly directed lugs 24 which are arranged to engage in complementary holes 25 formed in the top surface of the master cylinder body.

When the reservoir is slid on to the master cylinder the part 23 flexes due to its inherent resilience and the lugs 24 ride along the flat top surface 9 of the master cylinder. The lugs 24 engage in the holes 25 when the reservoir is properly located, with the reservoir outlet ports 15 in communication respectively with the openings 16 and 17 in the master cylinder body. The reservoir is thus properly located and positively retained in position.

FIG. 7 illustrates an alternative dovetail configuration for the recesses 12 which receive a reservoir having lateral projections of complementary shape. In FIG. 8 there is illustrated an alternative arrangement in which projections 26 are formed on the master cylinder body for co-operation with complementary recesses on the reservoir.

Each of the above-described forms of assembly has the advantage that its height is reduced as compared to known assemblies, that it is easy to assemble by sliding of the reservoir on to the master cylinder thus reducing the cost of assembly, that it is relatively cheap to manufacture, and that it is of lightweight construction.

It will be appreciated that, although described in relation to tandem master cylinders, the invention is applicable to master cylinders having only a single piston and pressure chamber.

I claim:

1. A master cylinder and reservoir assembly comprising an elongate master cylinder having a longitudinal axis and longitudinally extending recesses thereon, a reservoir having cooperating projections complementary to said recesses, said projections and recesses being so arranged as to permit interconnection of said reservoir and master cylinder by relative sliding movement in a direction generally parallel to said longitudinal axis of said master cylinder, said projections being formed on a foot portion of the reservoir, said foot portion having an aperture therethrough which cooperates with an aperture in the master cylinder wall to create a flow path between the reservoir and master cylinder, said foot portion having an extension and a downwardly extending lug on said extension engageable with a complementary hole in said master cylinder to locate and retain said reservoir in a desired predetermined position on said master cylinder.

2. An assembly according to claim 1, wherein the projections extend over only part of the length of the reservoir.

3. An assembly according to claim 1, wherein the base of the foot portion is flat and co-operates with a flat surface on the master cylinder, a seal between said surfaces surrounding the apertures.

4. An assembly according to claim 1, wherein the extension is inherently resilient and flexible to permit said longitudinal sliding assembly of the reservoir on the master cylinder.